United States Patent
Lo et al.

(10) Patent No.: US 11,314,158 B2
(45) Date of Patent: Apr. 26, 2022

(54) MICROELECTROMECHANICAL APPARATUS AND PROJECTION APPARATUS

(71) Applicants: Coretronic Corporation, Hsin-Chu (TW); Coretronic MEMS Corporation, Hsinchu County (TW)

(72) Inventors: Yi-Chien Lo, Hsin-Chu (TW); Shih-Hsiung Tseng, Hsin-Chu (TW)

(73) Assignees: Coretronic Corporation, Hsin-Chu (TW); Coretronics MEMS Corporation, Miaoli County (TW)

( * ) Notice: Subject to any disclaimer, the term of this patent is extended or adjusted under 35 U.S.C. 154(b) by 0 days.

(21) Appl. No.: 17/093,562

(22) Filed: Nov. 9, 2020

(65) Prior Publication Data

US 2021/0200074 A1 Jul. 1, 2021

Related U.S. Application Data (60) Provisional application No. 62/954,675, filed on Dec. 30, 2019.

(30) Foreign Application Priority Data

Sep. 22, 2020 (CN) .......................... 202011000182.4

(51) Int. Cl.
*G03B 21/20* (2006.01)
*G02B 5/02* (2006.01)
(Continued)

(52) U.S. Cl.
CPC ......... *G03B 21/208* (2013.01); *G02B 5/0215* (2013.01); *G02B 5/0278* (2013.01);
(Continued)

(58) Field of Classification Search
CPC .............. G03B 21/208; G03B 21/2033; G02B 5/0268; G02B 5/0278; G02B 27/48; G02B 26/0875
See application file for complete search history.

(56) References Cited

U.S. PATENT DOCUMENTS

2006/0038679 A1* 2/2006 Eskildsen ................. G01J 5/08
340/567
2010/0296064 A1 11/2010 Silverstein et al.
(Continued)

FOREIGN PATENT DOCUMENTS

| CN | 201845131 | 5/2011 |
| CN | 102207634 | 10/2011 |

(Continued)

OTHER PUBLICATIONS

"Search Report of Europe Counterpart Application", dated Apr. 28, 2021, pp. 1-10.
(Continued)

*Primary Examiner* — Ryan D Howard
(74) *Attorney, Agent, or Firm* — JCIPRNET (57) ABSTRACT

A microelectromechanical apparatus includes a substrate, a light diffuser device, a plurality of actuator devices, and a controller. The light diffuser device is disposed on the substrate. The actuator devices surround the substrate and are coupled to the substrate. The controller is coupled to the actuator devices. The controller applies a voltage to at least one of the actuator devices to drive the substrate and to control the light diffuser device to actuate according to a reference axis perpendicular to the light diffuser device. A projection apparatus is also provided. In the disclosure, a motion pattern and motion complexity of the light diffuser device may be enhanced. Enhancement of the movement pattern and movement complexity may lead to a significant
(Continued)

increase in a speckle pattern contrast ratio, such that the projection apparatus may provide favorable image quality.

20 Claims, 6 Drawing Sheets

(51) Int. Cl.
  *G02B 26/08* (2006.01)
  *G02B 27/48* (2006.01)

(52) U.S. Cl.
  CPC ......... *G02B 26/0875* (2013.01); *G02B 27/48* (2013.01); *G03B 21/2013* (2013.01); *G03B 21/2033* (2013.01)

(56) References Cited

U.S. PATENT DOCUMENTS

| | | | |
|---|---|---|---|
| 2012/0206782 A1* | 8/2012 | Chan | G02B 5/0284 359/199.2 |
| 2014/0055755 A1 | 2/2014 | Fan | |
| 2015/0286064 A1 | 10/2015 | Liu | |

FOREIGN PATENT DOCUMENTS

| | | |
|---|---|---|
| CN | 102681198 | 9/2012 |
| CN | 103631076 | 3/2014 |
| CN | 106707671 | 5/2017 |
| TW | 201539043 | 10/2015 |
| WO | 2013068137 | 5/2013 |

OTHER PUBLICATIONS

T. Mizushima et al., "L-9: Late-News Paper: Laser Projection Display with Low Electric Consumption and Wide Color Gamut by Using Efficient Green SHG Laser and New Illumination Optics," SID Symposium Digest of Technical Papers, vol. 37, Issue 1, Jul. 2012, pp. 1681-1684.

Po-Hung Yao et al., "Low speckle laser illuminated projection system with a vibrating diffractive beam shaper," Optics Express, vol. 20, Issue 15, Jul. 2012, pp. 16552-16566.

Fergal Shevlin, "Phase randomization for spatiotemporal averaging of unwanted interference effects arising from coherence," Applied Optics, vol. 57, Issue 22, Apr. 2018, pp. 1-5.

Tingting Wang et al., "The implementation of laser speckle reduction based on MEMS two-dimensional scanning mirror," SPIE/COS Photonics Asia, Oct. 2016, Beijing, China, pp. 1-9.

"Office Action of China Counterpart Application", dated Jan. 18, 2022, p. 1-p. 9.

* cited by examiner

MICROELECTROMECHANICAL APPARATUS AND PROJECTION APPARATUS

CROSS-REFERENCE TO RELATED APPLICATION

This application claims the priority benefit of U.S. provisional application Ser. No. 62/954,675, filed on Dec. 30, 2019 and China application serial no. 202011000182.4, filed on Sep. 22, 2020. The entirety of the above-mentioned patent application is hereby incorporated by reference herein and made a part of this specification.

BACKGROUND

Technical Field

The disclosure relates to a microelectromechanical apparatus and a projection apparatus applying the microelectromechanical apparatus.

Description of Related Art

In a laser projection apparatus, a speckle may be easily observed on a screen or on a virtual image. That is because the laser itself has high coherence, and self-interference may occur when the laser passes through the scattering surface of the system. A speckle is thereby produced. An image may be covered by a layer of noise-like distribution as affected by the generation of speckles, and unfavorable image quality is provided by the projection apparatus as a result. The speckle contrast ratio is generally used to determine the influence of speckles. The contrast is defined as the ratio of the standard deviation of the speckle brightness distribution to the average value. The contrast is usually inversely proportional to the square root of the number of independent speckles (speckle pattern) perceived (or sensed) by the human eye (or an image sensor) during the integration time. In the existing art, a diffuser wheel is disposed in a projection apparatus. An increase in speed of the diffuser wheel may also lead to a significant increase in the number of independent speckles. Nevertheless, the volume of the diffuser wheel is excessively large, and the use of the diffuser wheel may not satisfy the trend of miniaturization of existing laser projection apparatuses. Further, the diffuser wheel may easily damage the polarization state of the laser beam and thus may not be applied in some forms (e.g., a liquid-crystal-on-silicon panel (LCOS Panel)) of laser projection apparatuses.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides a microelectromechanical apparatus allowing a projection apparatus applying the microelectromechanical apparatus to provide favorable image quality and exhibit a reduced volume.

The disclosure provides projection apparatus capable of providing a favorable image quality and exhibiting a reduced volume.

Other objects and advantages of the disclosure may be further illustrated by the technical features broadly embodied and described as follows.

An embodiment of the disclosure provides a microelectromechanical apparatus including a substrate, a light diffuser device, and a controller. The light diffuser device is disposed on the substrate. Actuator devices are disposed around the substrate and coupled to the substrate. The controller is coupled to the actuator devices. The controller applies a voltage to at least one of the actuator devices to drive the substrate and to control the light diffuser device to actuate according to a reference axis perpendicular to the light diffuser device.

An embodiment of the disclosure provides a projection apparatus including an illumination system, a light valve, and a projection lens. The illumination system includes at least one laser light source and at least one of the microelectromechanical apparatus. The at least one laser light source is configured to emit at least one laser light beam. The illumination system forms an illumination light beam through the at least one laser light beam. The at least one microelectromechanical apparatus is disposed on a transmission path of the at least one laser light beam. The light valve is disposed on a transmission path of the illumination light beam. The light valve converts the illumination light beam into an image light beam. The projection lens is disposed on a transmission path of the image light beam.

To sum up, in the microelectromechanical apparatus and the projection apparatus provided by the embodiments of the disclosure, the light diffuser device is disposed on the substrate, and the actuator devices are coupled to the substrate. In the process that the laser light beam penetrates through the actuated light diffuser device, the controller may easily increase a number of the motion patterns of the light diffuser device through selectively applying a voltage to at least part of the actuator devices located at different positions. An increase in the number of the motion patterns may lead to an increase in independent speckles, and a speckle contrast ratio may thus be reduced. In this way, the projection apparatus may provide favorable image quality. Moreover, compared to a diffuser wheel adopted by the existing art, since the microelectromechanical apparatus adopted by the embodiments of the disclosure exhibits a reduced volume, the projection apparatus may exhibit a reduced volume as well. Besides, the light diffuser device may not easily affect the polarization state of a laser light beam and thus may be applied to a laser projection apparatus having a liquid-crystal-on-silicon panel (LCOS panel).

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
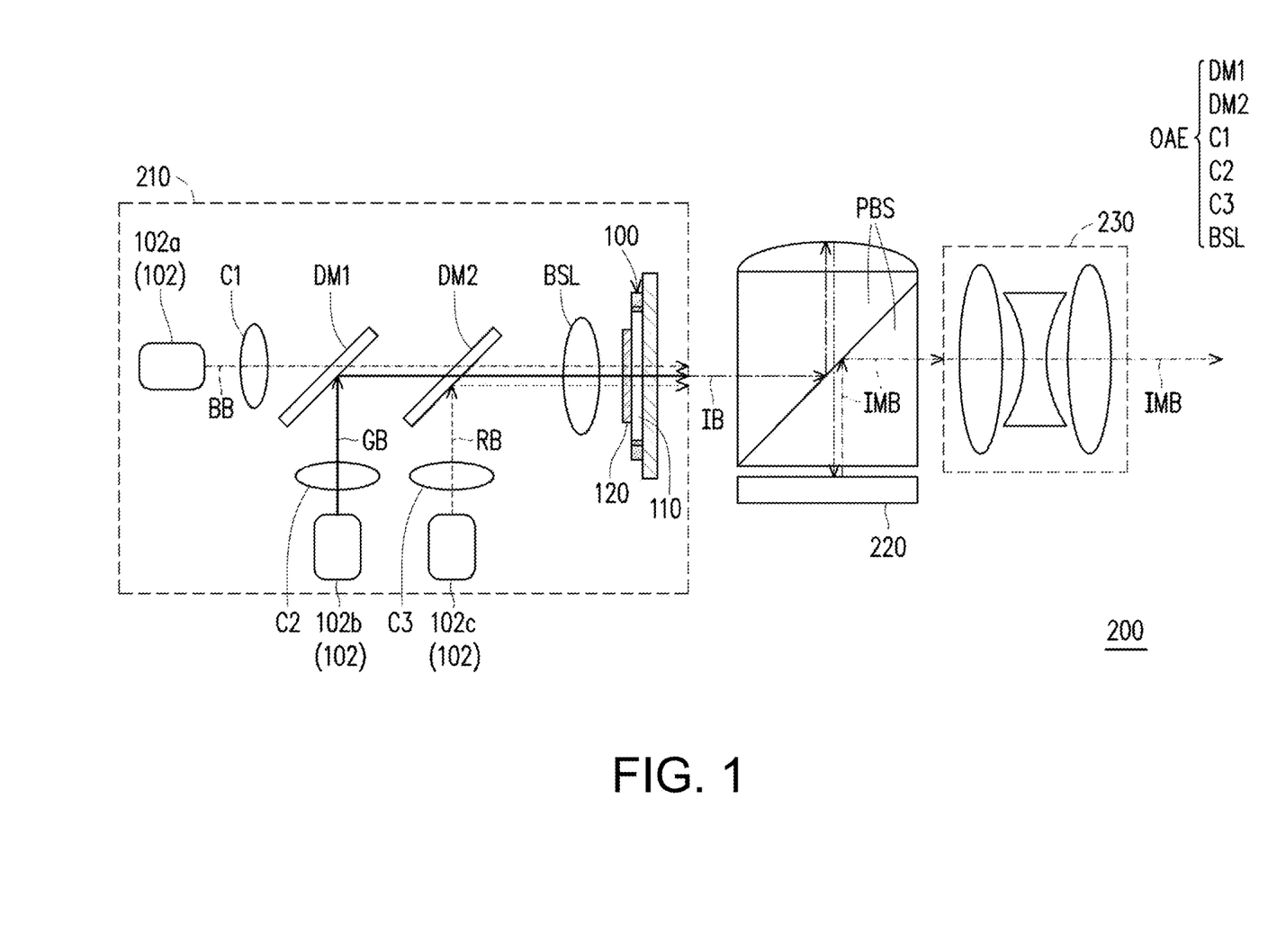
FIG. 1 is a schematic view of a structure of a projection apparatus according to an embodiment of the disclosure.
Figure 2A:
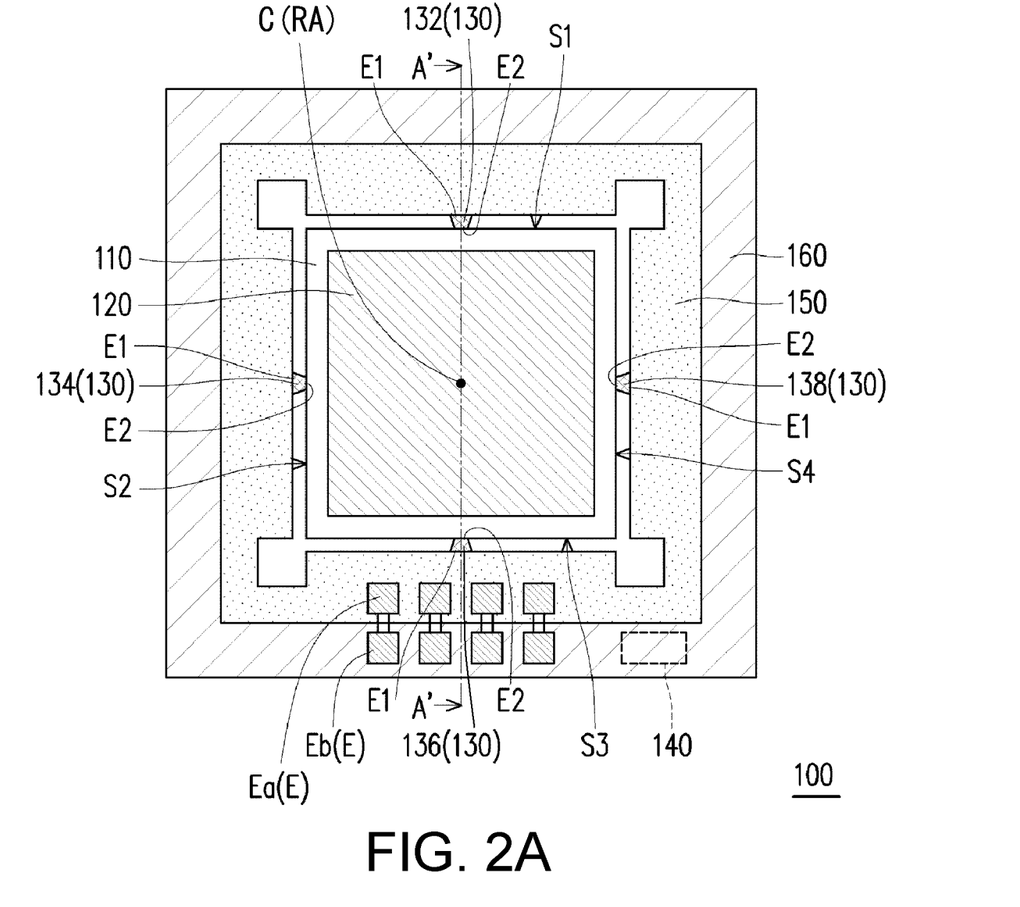
FIG. 2A is a front schematic view of a microelectromechanical apparatus 100 in FIG. 1.
Figure 2B:
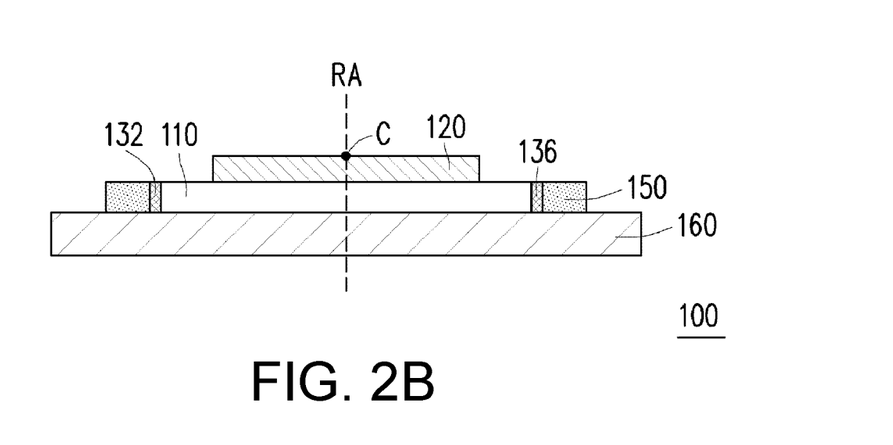
FIG. 2B is a cross-sectional schematic view taken along a cross-sectional line A-A' in FIG. 2A.
Figure 2C:
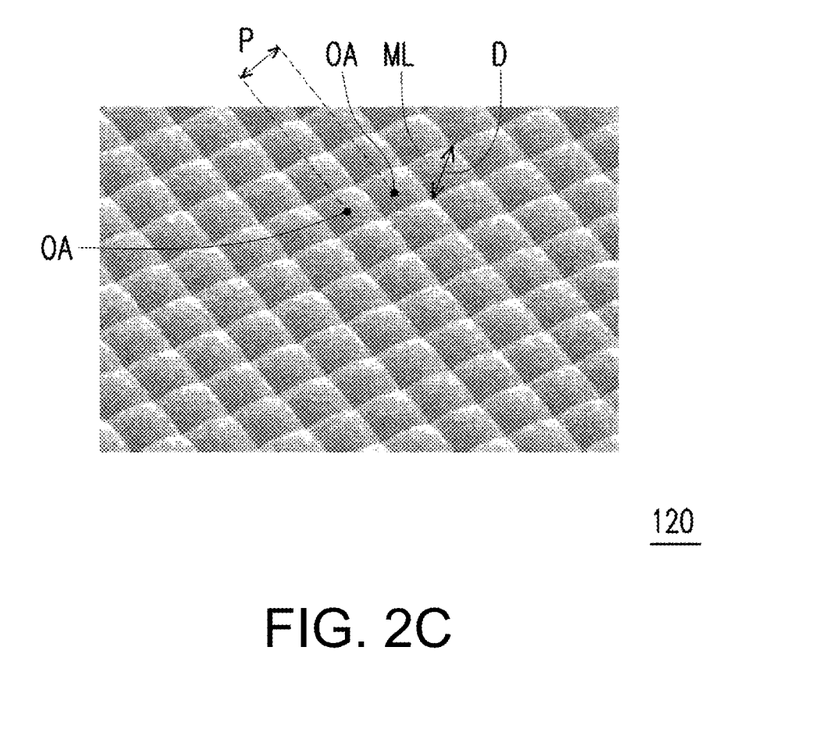
FIG. 2C is an oblique enlargement schematic view of a light diffuser device in FIG. 2A.

FIG. 1 is a schematic view of a structure of a projection apparatus according to an embodiment of the disclosure. FIG. 2A is a front schematic view of a microelectromechanical apparatus 100 in FIG. 1. FIG. 2B is a cross-sectional schematic view taken along a cross-sectional line A-A' in FIG. 2A. FIG. 2C is an oblique enlargement schematic view of a light diffuser device in FIG. 2A.

With reference to FIG. 1, in this embodiment, a projection apparatus 200 includes an illumination system 210, a light valve 220, and a projection lens 230. The illumination system 210 includes at least one laser light source 102 and a microelectromechanical apparatus 100. The foregoing devices are described in detail in the following paragraphs.

First, devices in the illumination system 210 are described.

The laser light source 102 may be an array arranged by one or a plurality of laser light-emitting devices or an optical device assembly formed by one or a plurality of laser light-emitting devices, a reflector, or a lens, which should however not be construed as limitations to the disclosure. Herein, the laser light-emitting device is a laser diode (LD), for example. In the present embodiment, a number of the at least one laser light source 102 is three, for example, and are marked as 102a to 102c. A blue laser light source 102a is suited to emit a blue laser light beam BB. A green laser light source 102b is suited to emit a green laser light beam GB. A red laser light source 102c is suited to emit a red laser light beam RB.

With reference to FIG. 1, FIG. 2A, FIG. 2B, and FIG. 2C, the microelectromechanical apparatus 100 includes a substrate 110, a light diffuser device 120, a plurality of actuator devices 130, a controller 140, a frame body 150, and a circuit carrier board 160. The light diffuser device 120 is, for example, attached on the substrate 110, or the light diffuser device 120 and the substrate 110 are integrated as a single device, which is not particularly limited by the disclosure. An operation range of the microelectromechanical apparatus 100 (shifting range) is within a micrometer range. Detailed description of the devices of the microelectromechanical apparatus 100 are provided as follows.

A material of the substrate 110 includes, but not limited to, a material that allows a light beam to pass through, such as glass. With reference to FIG. 2A, in this embodiment, the substrate 110 includes a first side surface to a fourth side surface S1 to S4. The first side surface S1 is opposite to the third side surface S3, and the second side surface S2 is opposite to the fourth side surface S4. The first side surface S1 and the third side surface S3 are respectively connected to the second side surface S2 and the fourth side surface S4 together, and the second side surface S2 and the fourth side surface S4 are respectively connected to the first side surface S1 and the third side surface S3 together.

In this embodiment, a micro lens array is taken as an example herein for the illustration of the light diffuser device 120. The light diffuser device 120 are formed by a plurality of micro lenses ML, and the micro lenses ML are arranged into an array, as shown in FIG. 2C. Arrangement of the micro lenses ML shown in FIG. 2C is presented for illustration only, and the micro lenses ML in the disclosure are not required to be arranged in this way and may be randomly arranged, for example. In this embodiment, a diagonal D of each of the micro lenses ML falls in a range between, but not limited to, 10 μm to 500 μm. Besides, each micro lens ML has an optical center OA. A pitch P of the light diffuser device 120 is defined as a distance between two optical centers OA of two adjacent micro lenses ML, and a length of the pitch P falls in a range between 10 μm to 500 μm. In other embodiments, the light diffuser device 120 may be an optical device such as a diffraction micro lens array or a diffusion plate.

The actuator devices 130 are devices that convert electrical energy into mechanical energy and control and drive an object to perform predetermined movement. In this embodiment, a material of the actuator devices 130 includes a piezoelectric material, and the piezoelectric material is a material that may produce a piezoelectric effect. To be specific, the piezoelectric effect may be a positive piezoelectric effect or a negative piezoelectric effect. The positive piezoelectric effect refers to that when a piezoelectric material is deformed by being applied by a pressure, mechanical energy is converted into electrical energy. The negative piezoelectric effect refers to that when a surface of a piezoelectric material is applied by a voltage, an electric dipole moment inside the material is elongated and deformed, such that electrical energy is converted into mechanical energy. In this embodiment, the actuator devices 130 are devices capable of producing mechanical energy to drive an object to move through the negative piezoelectric effect. Moreover, a number of the actuator devices 130 is 4, for example, and are called as a first actuator device 132, a second actuator device 134, a third actuator device 136, and a fourth actuator device 138.

The controller 140 may be a calculator, a microprocessor (micro controller unit (MCU)), a central processing unit (CPU), or other programmable controllers (microprocessor), a digital signal processor (DSP), a programmable controller, an application specific integrated circuit (ASIC), a programmable logic device (PLD), or other similar devices, which should however not be construed as limitations to the disclosure.

The frame body 150 is, for example, a rectangular frame body, but a shape of the frame body is not particularly limited by the disclosure.

The circuit carrier board 160 is, for example, a printed circuit board (PCB), and a type of the circuit carrier board 160 is not particularly limited by the disclosure.

Detailed description of a structure of the microelectromechanical apparatus 100 are provided in the following paragraphs.

With reference to FIG. 2A and FIG. 2B, when the microelectromechanical apparatus 100 is viewed from the outside to the inside, the frame body 150 is disposed next to the substrate 110 and surrounds the substrate 110. Each of the actuator devices 130 has a first end E1 and a second end E2 opposite to each other. The first end E1 is connected to the frame body 150, and the second end E2 is connected to the substrate 110. In detail, the first ends E1 of the first to the fourth actuator devices 132, 134, 136, and 138 are all connected to the frame body 150. The second end E2 of the first actuator device 132 is connected to the first side surface S1 of the substrate 110. The second end E2 of the second actuator device 134 is connected to the second side surface S2 of the substrate 110. The second end E2 of the third actuator device 136 is connected to the third side surface S3 of the substrate 110. The second end E2 of the fourth actuator device 138 is connected to the fourth side surface S4 of the substrate 110. From another point of view, the actuator devices 130 are symmetrically disposed around the substrate 110.

Note that in other embodiments that are not shown, the number of the actuator devices may not be limited to four and may be less than or greater than four, which should however not be construed as limitations to the disclosure. In addition, the actuator devices 130 may be asymmetrically disposed around the substrate 110. For instance, it may be that two actuator devices are disposed on the first side surface, another actuator device is disposed on the second side surface, and still another actuator device is disposed on the third side surface, which should however not be construed as limitations to the disclosure.

With reference to FIG. 2A and FIG. 2B again, the light diffuser device 120 is disposed on the substrate 110. The substrate 110, the light diffuser device 120, and the actuator devices 130 are all disposed on the circuit carrier board 160. The controller 140 is integrated in the circuit carrier board 160. Besides, the light diffuser device 120 further includes a plurality of electrode pairs E. One electrode Ea in each of the electrode pairs E is disposed on the frame body 150, and the other electrode Eb in each of the electrode pairs E is disposed on the circuit carrier board 160. The electrode Ea is electrically connected to the actuator devices 130, and the electrode Eb is electrically connected to the controller 140. The controller 140 is coupled to the actuator devices 130 through these electrode pairs E. The controller 140 may selectively apply a voltage to any one of the actuator devices 130.

Next, other devices in the projection apparatus 200 are described.

The light valve 220 refers to any spatial light modulator, including, but not limited to, a digital micro-mirror device (DMD), a liquid-crystal-on-silicon panel (LCOS panel), or a liquid crystal panel (LCD). In this embodiment, the light valve 220 is a LCOS panel.

The projection lens 230 includes, for example, one optical lens or a combination of a plurality of optical lenses with refracting powers, and the optical lens includes various non-planar lens combinations of a biconcave lens, a biconvex lens, a concave-convex lens, a convex-concave lens, a plane-convex lens, and a plane-concave lens, for example. A form and a type of the projection lens 230 is not particularly limited in the disclosure.

In addition, a plurality of optical adjustment devices, for example, may be selectively disposed in the projection apparatus 200 or the illumination system 210. These optical adjustment devices OAE, for example, are devices capable of modifying an optical property or an optical path in the projection apparatus 200 or the illumination system 210. In this embodiment, the optical adjustment devices OAE, for example, include focusing lenses C1 to C3, beam splitters DM1 and DM2, light shape adjustment lens BSL, and a polarizing beam splitting prism PBS. In this embodiment, the focusing lenses C1 to C3 are, for example, lenses configured to focus light beams, and are, for example, convex lenses, which should however not be construed as limitations to the disclosure. The beam splitters DM1 and DM2 may be devices configured to, for example, reflect light beams in a specific wavelength range and allow light beams in other wavelength ranges to pass through. The beam splitter DM1 may, for example, reflect green light and allow light of other colors to pass through, and the beam splitter DM2 may, for example, reflect red light and allow light of other colors to pass through, which should however not be construed as limitations to the disclosure. The light shape adjustment lens BSL is configured to modify shapes of the laser light beams BB, GB, and RB. The polarizing beam splitting prism PBS is adapted to allow reflection of a light beam exhibiting a specific polarizing direction.

Arrangement of the foregoing devices is described in detail in the following paragraphs.

First, arrangement of the devices in the illumination system 210 is described.

With reference to FIG. 1 again, in the illumination system 210, the focusing lens C1 is disposed downstream of an optical path of the blue laser light source 102a, the focusing lens C2 is disposed downstream of an optical path of the green laser light source 102b, and the focusing lens C3 is disposed downstream of an optical path of the red laser light source 102c. The beam splitter DM1 is disposed downstream of optical paths of the focusing lenses C1 and C2. The beam splitter DM2 is disposed downstream of optical paths of the beam splitter DM1 and the focusing lens C3. The light shape adjustment lens BSL is disposed downstream of an optical path of the illumination system 210. The microelectromechanical apparatus 100 is disposed downstream of an optical path of the light shape adjustment lens BSL (i.e., the microelectromechanical apparatus 100 is disposed on a transmission path of an illumination light beam IB). To be more specific, the substrate 110 and the light diffuser device 120 in the microelectromechanical apparatus 100 are disposed on the transmission paths of the laser light beams BB, RB, and GB.

Herein, light travels from upstream to downstream of the optical path. Therefore, the downstream of the light path of one device may be understood as part of the light path after the light passes through the device. For instance, regarding the downstream optical path of the blue laser light source 102a, the optical path of the blue laser light beam BB emitted from the blue laser light source 102a is called as the downstream optical path of the blue laser light source 102a. For instance, the focusing lens C1 is located downstream of the optical path of the blue laser light source 102a. For instance, the beam splitter DM1 is located downstream of the optical paths of the blue and green laser light sources 102a and 102b, and the rest may be deduced by analogy.

Next, arrangement of the devices in the projection apparatus 200 except the illumination system 210 is described.

With reference to FIG. 1 again, in the projection apparatus 200, the polarizing beam splitting prism PBS is disposed downstream of an optical path of the microelectromechanical apparatus 100. The light valve 220 is disposed downstream of an optical path of the polarizing beam splitting prism PBS. The projection lens 230 is disposed downstream of the polarizing beam splitting prism PBS.

Figure 3:
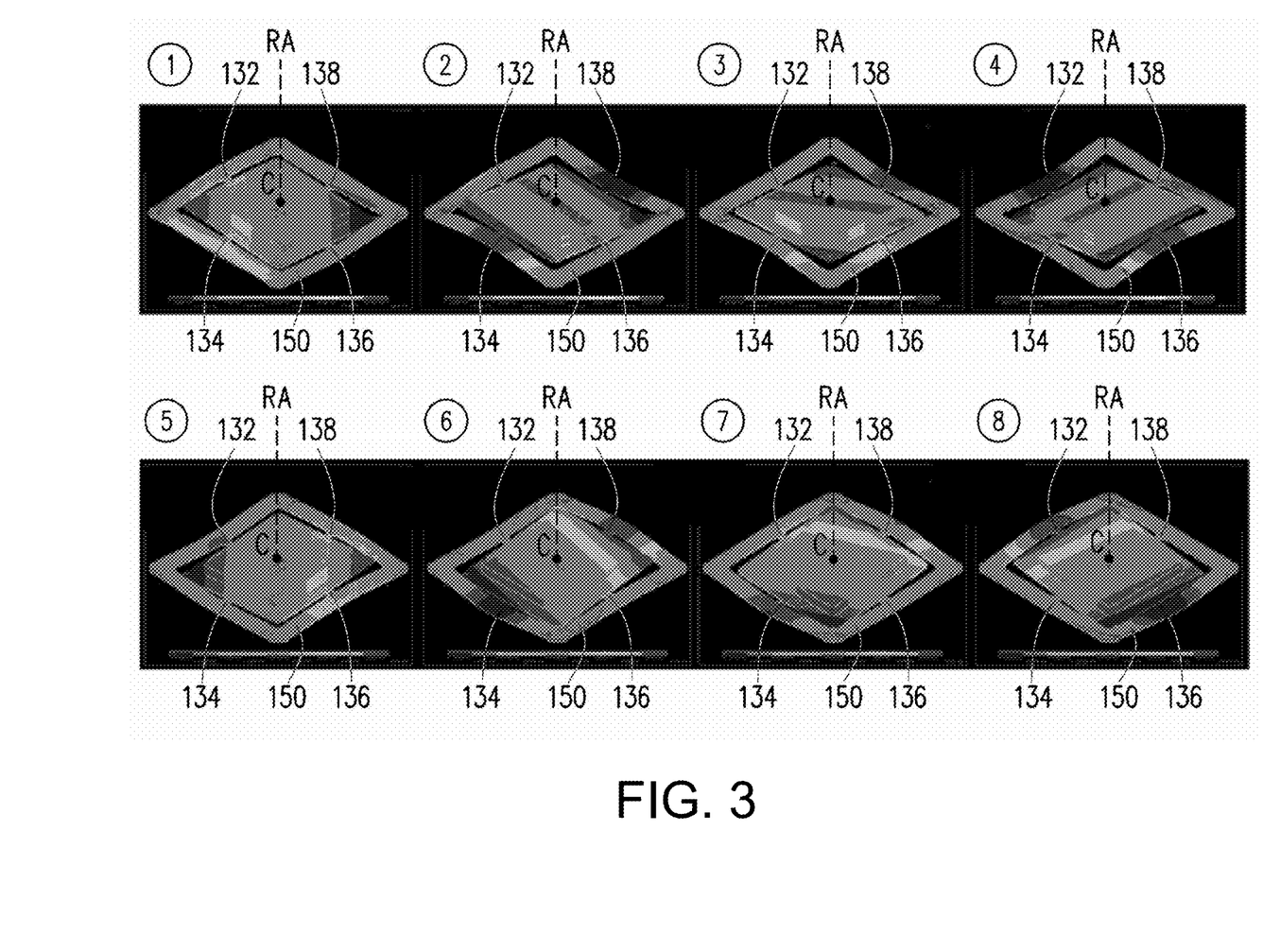
FIG. 3 is a simulation view of different motion patterns of the microelectromechanical apparatus at different times.

FIG. 3 is a simulation view of different motion patterns of the microelectromechanical apparatus at different times.

In the following paragraphs, an optical effect of the projection apparatus 200 and an actuation principle and effect of the microelectromechanical apparatus 100 provided by the present embodiment are described in detail together with FIG. 1 and FIG. 3.

With reference to FIG. 1, when the blue laser light source 102a emits the blue laser light beam BB, the blue laser beam BB is emitted out of the illumination system 210 after penetrating through the focusing lens C1, the beam splitter DM1, the beam splitter DM2, the light shape adjustment lens BSL, the light diffuser device 120, and the substrate 110 is sequence. When the green laser light source 102b emits the green laser light beam GB, the green laser beam GB is emitted out of the illumination system 210 after penetrating through the focusing lens C2, being reflected by the beam splitter DM1, and penetrating through the beam splitter DM2, the light shape adjustment lens BSL, the light diffuser device 120, and the substrate 110 is sequence. When the red laser light source 102c emits the red laser light beam RB, the red laser beam RB is emitted out of the illumination system 210 after penetrating through the focusing lens C3, being reflected by the beam splitter DM2, and penetrating through the light shape adjustment lens BSL, the light diffuser device 120, and the substrate 110 is sequence. After any one of the blue, green, and red laser light beams BB, GB, and RB or a combination thereof is emitted out of the illumination system 210, the illumination light beam IB is formed. The illumination light beam IB is then transmitted to the polarizing beam splitting prism PBS. After the illumination light beam IB is guided by the polarizing beam splitting prism PBS to the light valve 220, at least one portion of the illumination light beam IB is converted to an image light beam IMB by the light valve 220. The image light beam IMB is then guided by the polarizing beam splitting prism PBS to the projection lens 230, and the image light beam IMB is projected onto a projection medium (e.g., a projection screen) by the projection lens 230.

With reference to FIG. 3, in the process when the illumination light beam IB penetrates through the light diffuser device 120, the controller 140 may selectively apply a voltage to at least one of the actuator devices to drive the substrate 110 and to indirectly control the light diffuser device 120 to actuate according to a reference axis RA perpendicular to the light diffuser device 120. The reference axis RA may pass through a geometric center C of the light diffuser device 120, for example. In FIG. 3, darker colors indicate more deformation, and lighter colors indicate less deformation. In the following paragraphs, an exemplary voltage application manner of the controller 140 is described based on different sub-FIGS. ① to ⑧ in FIG. 3.

In sub-FIG. ①, the controller 140 selectively applies a positive voltage to the first and second actuator devices 132 and 134 located at different positions and applies a negative voltage to the third and fourth actuator devices 136 and 138. As affected by the foregoing voltage application manner, an upper left corner (the corner at a junction of the first actuator device 132 and the second actuator device 134) of the light diffuser device 120 moves upwards, and a lower right corner (the corner at a junction of the third actuator device 136 and the fourth actuator device 138) moves downwards.

In sub-FIG. ②, the controller 140 selectively applies a positive voltage to the second actuator device 134, applies a negative voltage to the fourth actuator device 138, and does not apply any voltage to the first and third actuator devices 132 and 136. As affected by the foregoing voltage application manner, a left side (the side where the second actuator device 134 is located) of the light diffuser device 120 moves upwards, and a right side (the side where the fourth actuator device 138 is located) moves downwards.

In sub-FIG. ③, the controller 140 selectively applies a positive voltage to the second and third actuator devices 134 and 136 located at different positions and applies a negative voltage to the first and fourth actuator devices 132 and 138. As affected by the foregoing voltage application manner, a lower left corner (the corner at a junction of the second actuator device 134 and the third actuator device 136) of the light diffuser device 120 moves upwards, and an upper right corner (the corner at a junction of the first actuator device 132 and the fourth actuator device 138) moves downwards.

In sub-FIG. ④, the controller 140 selectively applies a negative voltage to the first actuator device 132 located at a different position, applies a positive voltage to the third actuator device 136, but does not apply any voltage to the second and fourth actuator devices 134 and 138. As affected by the foregoing voltage application manner, an upper side (the side where the first actuator device 132 is located) of the light diffuser device 120 moves downwards, and a lower side (the side where the third actuator device 136 is located) moves upwards.

In sub-FIG. ⑤, the controller 140 selectively applies a negative voltage to the first and second actuator devices 132 and 134 located at different positions and applies a positive voltage to the third and fourth actuator devices 136 and 138. As affected by the foregoing voltage application manner, the upper left side of the light diffuser device 120 moves downwards, and the lower right corner moves upwards.

In sub-FIG. ⑥, the controller 140 selectively applies a negative voltage to the second actuator device 134, applies a positive voltage to the fourth actuator device 138, and does not apply any voltage to the first and third actuator devices 132 and 136. As affected by the foregoing voltage application manner, the left side of the light diffuser device 120 moves downwards, and the right side moves upwards.

In sub-FIG. (7), the controller 140 selectively applies a negative voltage to the second and third actuator devices 134 and 136 located at different positions and applies a positive voltage to the first and fourth actuator devices 132 and 138. As affected by the foregoing voltage application manner, the lower left corner of the light diffuser device 120 moves downwards, and the upper right corner moves upwards.

In sub-FIG. (8), the controller 140 selectively applies a positive voltage to the first actuator device 132 located at a different position, applies a negative voltage to the third actuator device 136, but does not apply any voltage to the second and fourth actuator devices 134 and 138. As affected by the foregoing voltage application manner, the upper side of the light diffuser device 120 moves upwards, and the lower side moves downwards.

Therefore, through the voltage application manners provided in sub-FIGS. (1) to (8), the controller 140 sets the light diffuser device 120 to actuate according to the reference axis RA perpendicular to the light diffuser device 120, that is, to move along with the reference axis RA as a center axis. In addition, in voltage application manners shown in sub-FIG. (1) to sub-FIG. (8), the controller 140 applies voltages to the actuator devices 130 located at specific positions through a symmetrical voltage application manner. Taking sub-FIG. (1) as an example, the positions of the first and second actuator devices 132 and 134 being applied by a voltage are symmetrical to a diagonal of the light diffuser device 120. Taking sub-FIG. (2) as an example, the positions of the second and fourth actuator devices 134 and 138 are symmetrically arranged to pass through the left and right sides of the light diffuser device 120. The rest of the sub-figures may be arrived at by deduction. In the above sub-FIG. (1) to sub-FIG. (8), a two-point powering-on manner is applied, that is, only two among the four actuator devices are powered on to cause deformation. Nevertheless, the foregoing voltage application manner is only one of the manners achieving this motion pattern. The controller 140 may also accordingly adjust variables such as the voltage magnitude, positions, or voltage frequencies of these actuator devices 130, which should however not be construed as limitations to the disclosure. In another embodiment, the controller 140 applies a voltage in an irregular or random order, such that the light diffuser device 120 produces an irregular actuation manner.

Note that in other embodiments, the controller 140 may also asymmetrically apply a voltage to at least part of these actuator devices 130. For instance, only one among the first to fourth actuator devices may be applied by a voltage, and the remaining three are not being applied by a voltage. This voltage application manner may also be called as a one-point powering-on manner. In another embodiment, three among the first to fourth actuator devices may be applied by a voltage, and the remaining one is not being applied by a voltage. This voltage application manner may also be called as a three-point powering-on manner, which should however not be construed as limitations to the disclosure.

As described above, in the projection apparatus 200 provided by this embodiment, the controller 140 may easily increase a number of the motion patterns of the light diffuser device 120 through selectively applying a voltage to at least part of the actuator devices 130 located at different positions. An increase in the number of motion patterns may lead to an increase in independent speckles, and a speckle contrast ratio may thus be reduced. In this way, the projection apparatus 200 may provide favorable image quality. Moreover, compared to a diffuser wheel adopted by the existing art, since the microelectromechanical apparatus 100 adopted by the present embodiment exhibits a reduced volume, the projection apparatus 200 may exhibit a reduced volume as well.

In addition, in this embodiment, the microelectromechanical apparatus 100 adopts the light diffuser device 120 which may be penetrated by a light beam rather than a reflective mirror array which reflects a light beam. Further, optical path complexity may be increased as affected by the adoption of a reflective mirror array. It thus can be seen that the above-mentioned problem may be avoided through the use of the light diffuser device 120. Besides, the light diffuser device 120 may not easily affect a polarization state of a laser light beam and thus may be applied to an LCOS laser projection apparatus.

Note that if a voltage frequency applied by the controller 140 is identical to a resonance frequency of a material of these actuator devices 130, deformation generated by these actuator devices 130 may be significantly increased, so that the light diffuser device 120 may accordingly achieve a large swing amplitude. For instance, if the voltage frequency is equal to 1 kilohertz (1 KHz), the swing amplitude of the light diffuser device 120 may reach plus or minus 100 microns or greater.

Besides, if the length of the pitch P of the light diffuser device 120 is designed to be greater than 10 times a center wavelength of a laser light beam, an influence generated by diffraction or scattering of the laser light beam is not significant. Moreover, the light diffuser device 120 may be further coated with a specific film layer, so that increased light beams with a specific polarization state may be allowed to pass through.

Note that the LCOS laser projection apparatus provided in this embodiment acts as an exemplary example only, and the microelectromechanical apparatus 100 is not limited to this type of projection apparatus. Any projection apparatus which uses laser falls within the application scope of the microelectromechanical apparatus 100 provided by the embodiments of the disclosure.

Figure 4:
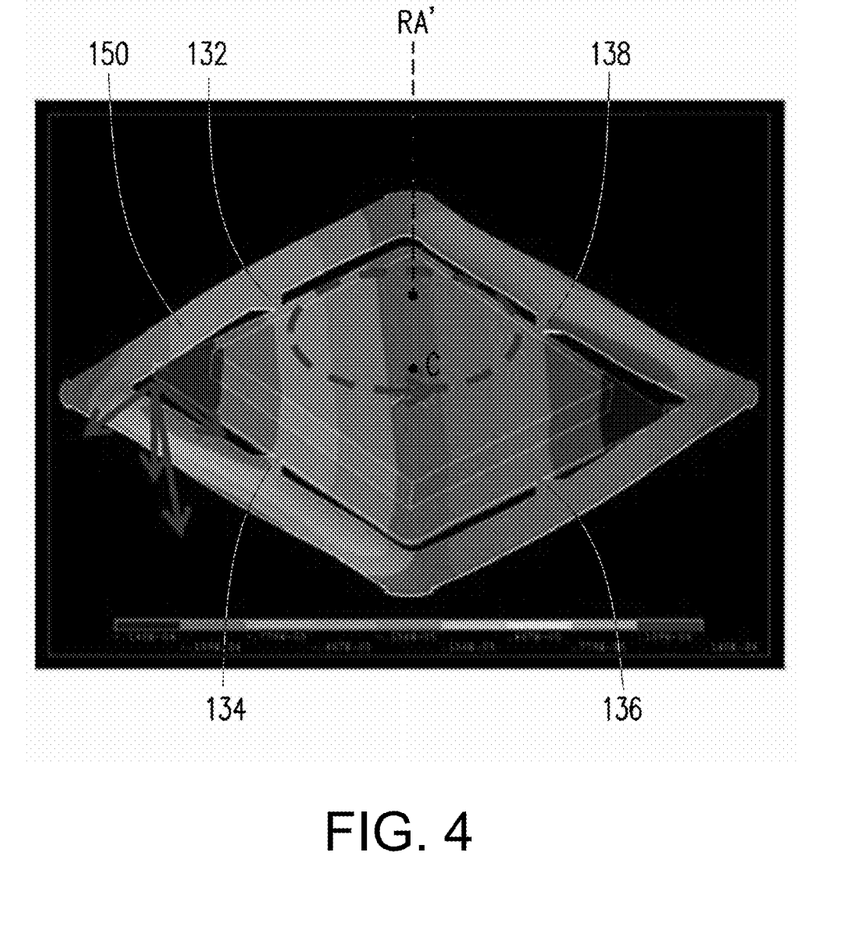
FIG. 4 is a simulation view of another motion state of the light diffuser device according to the disclosure.

FIG. 4 is a simulation view of another motion state of the light diffuser device according to the disclosure.

In FIG. 3, the light diffuser device 120 actuates based on the reference axis RA passing through the geometric center C thereof. Nevertheless, in FIG. 4, the light diffuser device 120 may also actuate based on a reference axis RA' deviated from the geometric center C thereof. In other words, the light diffuser device 120 actuates in an asymmetrical manner. In the microelectromechanical apparatus, the controller 140 may adjust variables such as the voltage magnitude, positions, or voltage frequencies applied to the first to fourth actuator devices 132, 134, 136, and 138, so that the voltage application manner to achieve the motion state shown in FIG. 4 may be accomplished, which should however not be construed as limitations to the disclosure.

Figure 5:
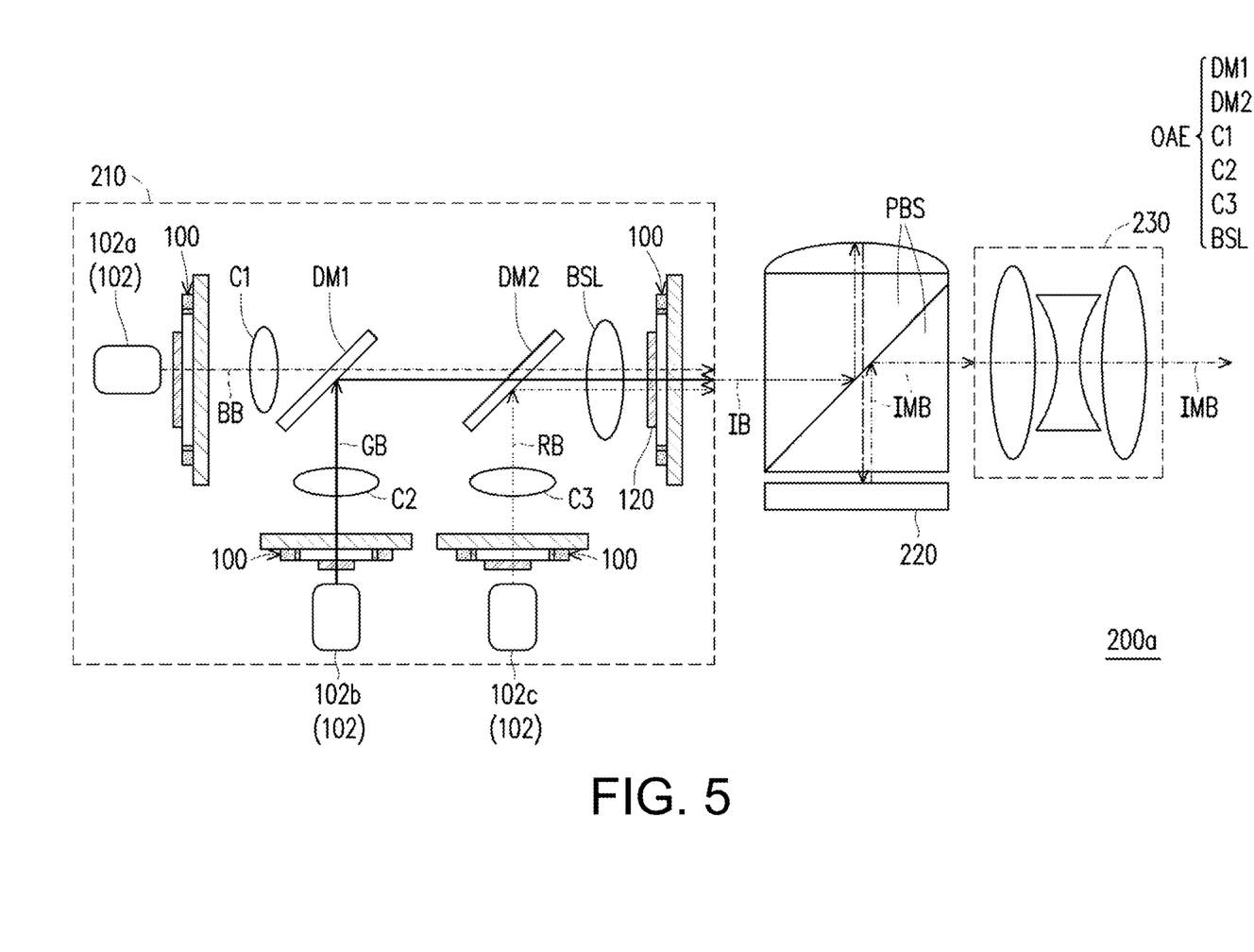
FIG. 5 is a schematic view of a structure of a projection apparatus according to another embodiment of the disclosure.

FIG. 5 is a schematic view of a structure of a projection apparatus according to another embodiment of the disclosure.

With reference to FIG. 5, a projection apparatus 200a provided in FIG. 5 is similar to the projection apparatus 200 provided in FIG. 1, and a difference therebetween lies in that the number of the microelectromechanical apparatus 100 is plural, such as four. To be specific, a microelectromechanical apparatus 100 is disposed on every optical path between each of the laser light sources 102a to 102c and the corresponding focusing lenses C1 to C3.

In view of the foregoing, in the microelectromechanical apparatus and the projection apparatus provided by the embodiments of the disclosure, the light diffuser device is disposed on the substrate, and the actuator devices are coupled to the substrate. In the process that the laser light beam penetrates through the actuated light diffuser device, the controller 140 may increase the motion patterns and motion complexity of the light diffuser device through selectively applying a voltage to at least part of the actuator devices located at different positions. An increase in motion patterns and motion complexity may lead to a significant decrease in the speckle contrast ratio. The projection apparatus may therefore provide favorable image quality. Moreover, compared to a diffuser wheel adopted by the existing art, since the light diffuser device exhibits a reduced volume, the projection apparatus may exhibit a reduced volume as well. Besides, the light diffuser device may not easily affect the polarization state of a laser light beam and thus may be applied to an LCOS laser projection apparatus.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A microelectromechanical apparatus, comprising a substrate, a light diffuser device, a plurality of actuator devices, and a controller, wherein:

the light diffuser device is disposed on the substrate, wherein the light diffuser device has a light incident surface with four corners, and the light incident surface is adapted to be penetrated by a light beam, the plurality of actuator devices are disposed around the substrate and coupled to the substrate, and the controller is coupled to the plurality of actuator devices, wherein the controller is configured to apply a voltage to at least one of the plurality of actuator devices, and, by the voltage, the at least one of the plurality of actuator devices is configured to be deformed to drive at least one of the four corners of the light diffuser device to move upwards or downwards along a reference axis perpendicular to the light incident surface of the light diffuser device.

2. The microelectromechanical apparatus according to claim 1, wherein the plurality of actuator devices are symmetrically disposed around the substrate.

3. The microelectromechanical apparatus according to claim 2, wherein the substrate has a first side surface and a third side surface opposite to each other and a second side surface and a fourth side surface opposite to each other, the first side surface and the third side surface are respectively connected to the second side surface and the fourth side surface together, and the second side surface and the fourth side surface are respectively connected to the first side surface and the third side surface together, wherein the plurality of actuator devices comprise a first actuator device, a second actuator device, a third actuator device, and a fourth actuator device, the first actuator device is disposed on the first side surface, the second actuator device is disposed on the second side surface, the third actuator device is disposed on the third side surface, and the fourth actuator device is disposed on the fourth side surface.

4. The microelectromechanical apparatus according to claim 2, wherein the controller asymmetrically applies the voltage to at least part of the plurality of actuator devices.

5. The microelectromechanical apparatus according to claim 4, wherein the reference axis deviates from a center of the light diffuser device.

6. The microelectromechanical apparatus according to claim 2, wherein the controller symmetrically applies the voltage to the plurality of actuator devices.

7. The microelectromechanical apparatus according to claim 6, wherein the reference axis passes through a center of the light diffuser device.

8. The microelectromechanical apparatus according to claim 1, wherein a voltage frequency applied by the controller to at least one of the plurality of actuator devices is identical to a resonance frequency of the at least one actuator device.

9. The microelectromechanical apparatus according to claim 1, further comprising:

a frame body, disposed next to the substrate and surrounding the substrate, wherein each of the plurality of actuator devices has a first end and a second end opposite to each other, the first end is connected to the frame body, and the second end is connected to the substrate.

10. The microelectromechanical apparatus according to claim 1, further comprising:

a circuit carrier board, wherein the substrate, the light diffuser device, and the plurality of actuator devices are disposed on the circuit carrier board, and the controller is integrated in the circuit carrier board.

11. A projection apparatus, comprising an illumination system, a light valve, and a projection lens, wherein:

the illumination system comprises at least one laser light source and at least one microelectromechanical apparatus, wherein the at least one laser light source is configured to emit at least one laser light beam, the illumination system forms an illumination light beam through the at least one laser light beam, the at least one microelectromechanical apparatus is disposed on a transmission path of the at least one laser light beam, the at least one microelectromechanical apparatus comprises a substrate, a light diffuser device, a plurality of actuator devices, and a controller, wherein the light diffuser device is disposed on the substrate, wherein the light diffuser device has a light incident surface with four corners, the light incident surface is adapted to be penetrated by the at least one laser light beam, and the substrate and the light diffuser device are disposed on the transmission path of the at least one laser light beam, the actuator devices are disposed around the substrate and coupled to the substrate, and the controller is coupled to the plurality of actuator devices, wherein the controller is configured to apply a voltage to at least one of the plurality of actuator devices and, by the voltage, the at least one of the plurality of actuator devices is configured to be deformed to drive at least one of the four corners of the light diffuser device to move upwards or downwards along a reference axis perpendicular to the light incident surface the light diffuser device, the light valve is disposed on a transmission path of the illumination light beam, wherein the light valve converts the illumination light beam into an image light beam, and the projection lens is disposed on a transmission path of the image light beam.

12. The projection apparatus according to claim 11, wherein the plurality of actuator devices are symmetrically disposed around the substrate.

13. The projection apparatus according to claim 12, wherein the substrate has a first side surface and a third side surface opposite to each other and a second side surface and a fourth side surface opposite to each other, the first side surface and the third side surface are respectively connected to the second side surface and the fourth side surface together, and the second side surface and the fourth side surface are respectively connected to the first side surface and the third side surface together, wherein, the plurality of actuator devices comprise a first actuator device, a second actuator device, a third actuator device, and a fourth actuator device, the first actuator device is disposed on the first side surface, the second actuator device is disposed on the second side surface, the third actuator device is disposed on the third side surface, and the fourth actuator device is disposed on the fourth side surface.

14. The projection apparatus according to claim 12, wherein the controller asymmetrically applies the voltage to the plurality of actuator devices.

15. The projection apparatus according to claim 14, wherein the reference axis deviates from a center of the light diffuser device.

16. The projection apparatus according to claim 12, wherein the controller symmetrically applies the voltage to the plurality of actuator devices.

17. The projection apparatus according to claim 16, wherein the reference axis passes through a center of the light diffuser device.

18. The projection apparatus according to claim 11, wherein a voltage frequency applied by the controller to at least one of the plurality of actuator devices is identical to a resonance frequency of the at least one actuator device.

19. The projection apparatus according to claim 11, further comprising:

a frame body, disposed next to the substrate and surrounding the substrate, wherein each of the plurality of actuator devices has a first end and a second end opposite to each other, the first end is connected to the frame body, and the second end is connected to the substrate.

20. The projection apparatus according to claim 11, further comprising:

a circuit carrier board, wherein the substrate, the light diffuser device, and the actuator devices are disposed on the circuit carrier board, and the controller is integrated in the circuit carrier board.

* * * * *